United States Patent
Chinen et al.

(10) Patent No.: US 8,144,804 B2
(45) Date of Patent: Mar. 27, 2012

(54) SIGNAL ENCODING APPARATUS AND METHOD, SIGNAL DECODING APPARATUS AND METHOD, PROGRAMS AND RECORDING MEDIUMS

(75) Inventors: Toru Chinen, Kanagawa (JP); Hiroyuki Honma, Chiba (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 11/456,242

(22) Filed: Jul. 10, 2006

(65) Prior Publication Data

US 2007/0011002 A1    Jan. 11, 2007

(30) Foreign Application Priority Data

Jul. 11, 2005  (JP) ................. P2005-202278

(51) Int. Cl.
    H04L 27/00    (2006.01)
(52) U.S. Cl. ........................................ 375/295
(58) Field of Classification Search .......... 375/130, 375/239, 260, 295, 327, 341; 704/203, 207, 704/226, 229, 500
    See application file for complete search history.

(56) References Cited

U.S. PATENT DOCUMENTS

| | | | | |
|---|---|---|---|---|
| 5,054,075 A * | 10/1991 | Hong et al. | .................... | 704/226 |
| 7,269,550 B2 * | 9/2007 | Tsushima et al. | ............. | 704/205 |
| 7,483,830 B2 * | 1/2009 | Rotola-Pukkila et al. | .... | 704/219 |
| 7,580,893 B1 * | 8/2009 | Suzuki | ............................. | 705/51 |
| 2003/0088328 A1 * | 5/2003 | Nishio et al. | .................... | 700/94 |
| 2003/0088400 A1 * | 5/2003 | Nishio et al. | ................... | 704/201 |
| 2003/0093271 A1 * | 5/2003 | Tsushima et al. | ............ | 704/230 |
| 2003/0142746 A1 * | 7/2003 | Tanaka et al. | ............ | 375/240.11 |
| 2005/0149339 A1 * | 7/2005 | Tanaka et al. | ................. | 704/500 |
| 2005/0171785 A1 * | 8/2005 | Nomura et al. | ............... | 704/500 |

FOREIGN PATENT DOCUMENTS

| | | |
|---|---|---|
| JP | 04-323700 | 11/1992 |
| JP | 2003-228399 | 8/2003 |
| JP | 2003-255997 | 9/2003 |
| JP | 2005-010801 | 1/2005 |

OTHER PUBLICATIONS

Japanese Office Action issued on Oct. 5, 2010 in connection with counterpart JP Application No. 2005-202278.

* cited by examiner

Primary Examiner — David C. Payne
Assistant Examiner — Syed Haider
(74) Attorney, Agent, or Firm — SNR Denton US LLP

(57) ABSTRACT

The encoding apparatus generates information for generating a high quality high frequency sub-band signal when expanding the frequency band at the decoding apparatus. A signal encoding apparatus divides an input time series signal into a plurality of sub-bands and encodes a low frequency sub-band signal to generate encoded data of the low frequency sub-band signal. Concurrently, it compares the frequency amplitude peak of the new high frequency sub-band signal generated from the low frequency sub-band signal and the original high frequency sub-band signal and generates frequency amplitude peak information of the high frequency sub-band signal. Similarly, it compares the gain of the new high frequency sub-band signal generated by using the low frequency sub-band signal and the original high frequency sub-band signal and generates gain information of the high frequency sub-band signal. Subsequently, the signal encoding apparatus multiplexes the encoded data of the low frequency sub-band signal, the frequency amplitude peak information of the high frequency sub-band signal and the gain information of the high frequency sub-band signal and outputs compressed data.

18 Claims, 7 Drawing Sheets

| Code | 000 | 001 | 010 | 011 | 100 | 101 | 110 | 111 |
|---|---|---|---|---|---|---|---|---|
| Frequency amplitude peak information of the high frequency sub-band signal p(i) | N(i)<1/8 | 1/8<=N(i)<2/8 | 2/8<=N(i)<3/8 | 3/8<=N(i)<4/8 | 4/8<=N(i)<5/8 | 5/8<=N(i)<6/8 | 6/8<=N(i)<7/8 | 7/8<=N(i) |
| Quantized value | 1/8 | 2/8 | 3/8 | 4/8 | 5/8 | 6/8 | 7/8 | 1 |

FIG.4

| Code | 00 | 01 | 10 | 11 |
|---|---|---|---|---|
| Frequency amplitude peak information of the high frequency sub-band signal p(i) | N(i)<1/4 | 1/4<=N(i)<2/4 | 2/4<=N(i)<3/4 | 3/4<=N(i) |
| Quantized value | 1/4 | 2/4 | 3/4 | 1 |

FIG. 7

SIGNAL ENCODING APPARATUS AND METHOD, SIGNAL DECODING APPARATUS AND METHOD, PROGRAMS AND RECORDING MEDIUMS

CROSS REFERENCES TO RELATED APPLICATIONS

The present invention contains subject matter related to Japanese Patent Application JP 2005-202278 filed in the Japanese Patent Office on Jul. 11, 2005, the entire contents of which being incorporated herein by reference.

BACKGROUND OF THE INVENTION

1. Field of the Invention

The present invention relates to a signal encoding apparatus, a signal encoding method, a signal decoding apparatus, a signal decoding method, programs and recording mediums that can suitably be used for expanding a sub-band signal limited to a certain frequency band at the encoding side to a broader frequency band at the decoding side.

2. Description of the Related Art

It has been made technically possible in recent years to compress the data of a CD (compact disc) and reduce the quantity of data to about 1/10 of the original quantity by utilizing the mechanism of the auditory sense of human being for the purpose of highly efficiently encoding audio signals. Currently, products produced by utilizing such techniques are marketed and compressed audio data are recorded on smaller recording mediums and distributed by way of networks.

With high efficiency compression coding, many recording companies have developed their own formats to make it possible to freely control the sound quality and the bit rate to a certain extent at the encoding side within the limits defined by the format. For instance, two modes of LP2 and LP4 that utilize same high efficiency compression techniques are available as long recording modes for MiniDiscs (MDs) (trademark, available from Sony Corporation). In the LP4 mode, data are compressed to a half of the data of the LP2 mode to realize recording hours twice as many as the recording hours of the LP2 mode, although the sound quality is lower.

However, with such high efficiency compression techniques, the bit rate and the sound quality are the clear target for design and standardization. In other words, the sound quality is remarkably degraded when the bit rate is lowered without modifying the standard (format). To avoid such a problem, techniques for improving the high efficiency encoding algorithm at the encoding side and those for limiting high frequency signals in a frequency band where the auditory sense of human being is not keen and assigning the surplus bits to low frequency signals are generally utilized.

[Non-Patent Document 1] Information Technology—Coding of Audio-Visual Objects—Part 3: Audio, ISO/IEC 14496-3: 2001

SUMMARY OF THE INVENTION

Attempts have been made to reproduce high frequency signals at the decoding side when high frequency signals are limited to lower the bit rate without modifying the format, while maintaining the sound quality, as described above. For example, Jpn. Pat. Appln. Laid-Open Publication No. 2-311006 describes a technique for doubling the reproduction band for PCM signals with 44.1 kHz sampling and Jpn. Pat. Appln. Laid-Open Publication No. 9-55778 describes a technique for expanding the frequency band of telephone at the receiving side.

While such techniques are advantageous in that they do not have to modify the format and make it suffice to improve the sound quality only at the decoding side, no dramatic improvement of sound quality is achieved because the band is expanded only from the received signals and distortions are noticeable to the auditory sense in a high band depending on the input sound source particularly when the low band and the high band are scarcely correlated.

On the other hand, attempts have also been made to expand the format and encode the information necessary to expand the frequency band at the encoding side so that the decoding side may be able to expand the frequency band, using the information for expanding the frequency band. For example, a technique for expanding the frequency band by using an LPC filter as described in U.S. Pat. No. 5,068,899 and a technique for expanding the frequency band by using a sub-band filter bank and a nonlinear device as described in U.S. Pat. No. 5,127,054 are known.

While such techniques provide an effect of improving voice signals, distortions of audio signals are noticeable to the auditory sense and hence is not able to realize a satisfactory sound quality.

Techniques are also known for achieving a satisfactory sound quality to a certain extent for audio signals. For example, HE-AAC (ISO/IEC 14496-3: 2001) of the ISO International Standards promises a sound quality that is satisfactory to a certain extent for audio signals.

FIG. 1 of the accompanying drawings is a schematic block diagram of a signal decoding apparatus for frequency band expansion by means of HE-AAC, illustrating the configuration thereof.

Of the signal decoding apparatus 70 for expanding a frequency band by means of HE-AAC, de-multiplexing circuit 71 divides the compressed data output from an encoding apparatus into low frequency band information and high frequency band information and supplies the low frequency band information and the high frequency band information respectively to a low frequency band information decoding circuit 72 and a frequency band expanding circuit 74.

The low frequency band information decoding circuit 72 decodes the low frequency band information to generate a low frequency band time series signal and supplies the low frequency band time series signal to a sub-band-division filter bank 73.

The sub-band-division filter bank 73 divides the low frequency band time series signal into a plurality of sub-bands and generates a low frequency sub-band signal. Then, it supplies the low frequency sub-band signal to the frequency band expansion circuit 74 and a sub-band-synthesis filter bank 75.

The frequency band expansion circuit 74 expands the frequency band, using the high frequency band information and the low frequency sub-band signal, to generate a high frequency sub-band signal. Subsequently, the frequency band expansion circuit 74 supplies the high frequency sub-band signal to the sub-band-synthesis filter bank 75.

The sub-band-synthesis filter bank 75 synthetically combines the low frequency sub-band signal and the high frequency sub-band signal to generate a time series signal that is an output signal.

The above-described band expansion circuit 74 whitens the low frequency sub-band signal by means of a linear prediction filter. Subsequently, the frequency band expansion circuit 74 regulates the gain of the whitened low frequency sub-band signal, using the high frequency band information containing the gain value of the high frequency sub-band signal, to generate a high frequency sub-band signal.

The whitening provides the effect of suppressing the peak of frequency amplitude of the low frequency sub-band signal. This effect is based on the statistic property of audio signals that high frequency sub-band signals are generally more whitened than low frequency sub-band signals. However, it is not certain that high frequency sub-band signals are more whitened for highly unsteady input signals that can fluctuate to a large extent with time such as voice signals and whitening does not provide a positive effect for such signals.

In view of the above-identified circumstances, it is desirable to provide a signal encoding apparatus and a signal encoding method that can expand a frequency band for audio signals and voice signals with a satisfactory quality level, a signal decoding apparatus and a signal decoding method for decoding the compressed data output from such a signal encoding apparatus, a program for causing a computer to execute such a signal encoding process, a program for causing a computer to execute such a signal decoding process and computer-readable recording mediums storing such programs.

According to an embodiment of the present invention, there is provided a signal encoding apparatus and method, which divides a time series signal into a plurality of sub-bands to generate a low frequency sub-band signal formed by low frequency side sub-bands and a high frequency sub-band signal formed by high frequency side sub-bands, encodes the low frequency sub-band signal to generate encoded data of the low frequency sub-band signal, generates a new high frequency sub-band signal from the low frequency sub-band signal and compares the frequency amplitude peak of the new high frequency sub-band signal and the high frequency sub-band signal to generate frequency amplitude peak information of the high frequency sub-band signal, compares the gain of the a new high frequency sub-band signal generated from the low frequency sub-band signal and the high frequency sub-band signal to generate gain information of the high frequency sub-band signal, and multiplexes the encoded data of the low sub-band signal, the frequency amplitude peak information of the high frequency sub-band signal and the gain information of the high frequency sub-band signal and outputs compressed data.

According to an embodiment of the present invention, there is provided a signal decoding apparatus and method, which de-multiplexes compressed data and separates into encoded data of the low frequency sub-band signal, frequency amplitude peak information of the high frequency sub-band signal and gain information of the high frequency sub-band signal, decodes the encoded data of the low frequency sub-band signal to generate a low frequency sub-band signal, expands the frequency band of the sub-band signal by using the low frequency sub-band signal, and adjusts the frequency amplitude peak of the obtained high frequency sub-band signal by using the frequency amplitude peak information of the high frequency sub-band signal, adjusts the gain of the high frequency sub-band signal, frequency amplitude peak of which has been adjusted, by using the gain information of the high frequency sub-band signal, and combines the low frequency sub-band signal and the high frequency sub-band signal, the frequency amplitude peak and the gain of which has been adjusted, to output a time series signal.

Furthermore, according to an embodiment of the present invention, there is provided a program for causing a computer to execute above-described signal encoding process or signal decoding process, and there is provided a computer-readable recording medium recording the program.

Thus, with a signal encoding apparatus, a signal encoding method, a signal decoding apparatus, a signal decoding method, programs and recording mediums according to the embodiments of the present invention, frequency amplitude peak information of the high frequency sub-band signal and gain information of the high frequency sub-band signal are generated at the time of limiting the frequency band by the encoding side and the frequency amplitude peak and the gain of the high frequency sub-band signal are adjusted by using the two pieces of information at the time of expanding the frequency band by the decoding side so that the frequency amplitude peak and the gain generated by the decoding side agree respectively with the frequency amplitude peak and the gain of the original high frequency sub-band signal. Therefore, it is possible to reproduce a high quality time series signal.

BRIEF DESCRIPTION OF THE DRAWINGS

FIG. 4 is a 3-bit quantization table to be used for the purpose of quantizing high frequency sub-band signal frequency amplitude peak information;

FIG. 7 is a 2-bit quantization table to be used for the purpose of quantizing high frequency sub-band signal frequency amplitude peak information.

DETAILED DESCRIPTION OF THE PREFERRED EMBODIMENTS

Now, the present invention will be described in greater detail by referring to the accompanying drawings that illustrate preferred embodiments of the invention.

Firstly, the signal encoding apparatus according to an embodiment of the present invention will be described below.

Figure 2:
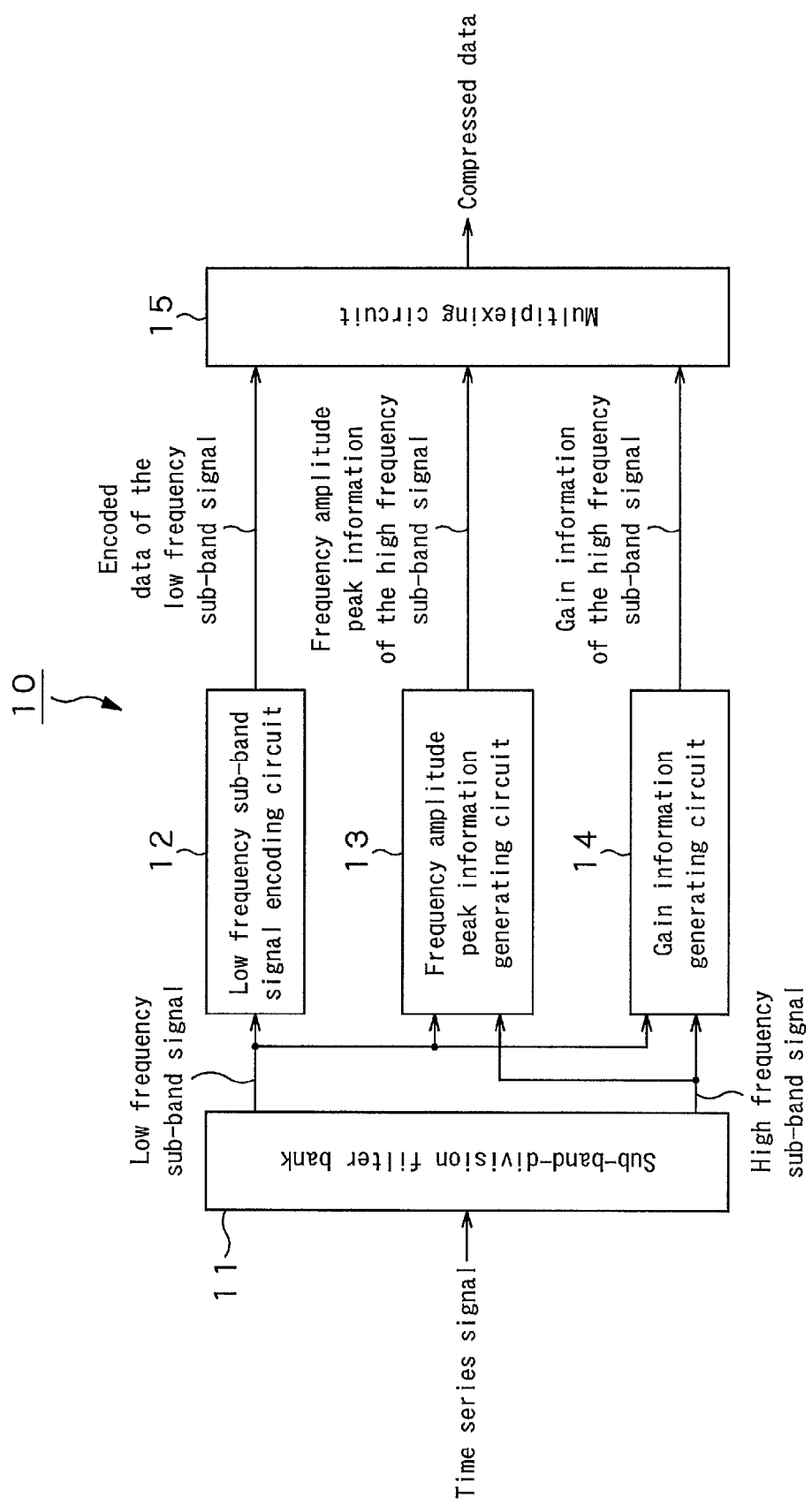
FIG. 2 is a schematic block diagram of a signal encoding apparatus according to an embodiment of the present invention, illustrating the configuration thereof.

Referring to FIG. 2, the signal encoding apparatus 10 of this embodiment has a sub-band-division filter bank 11, a low frequency sub-band signal encoding circuit 12, a frequency amplitude peak information generating circuit 13, a gain information generating circuit 14 and a multiplexing circuit 15.

The sub-band-division filter bank 11 divides an input time series signal into a plurality of sub-bands and supplies a low frequency sub-band signal formed by a plurality of low frequency side sub-bands to the low frequency sub-band signal encoding circuit 12, the frequency amplitude peak information generating circuit 13 and the gain information generating circuit 14.

The sub-band-division filter bank 11 also supplies a high frequency sub-band signal formed by a plurality of high frequency side sub-bands to the frequency amplitude peak information generating circuit 13 and the gain information generating circuit 14.

A sub-band signal is expressed here by x(k, n), where k can take any of the values of k=0, 1, 2, ..., N−1. In other words, k represents a sub-band and N represents the value of the divisor for producing sub-bands, while n represents a time index. As for the values of k, 0 indicates the lowest frequency sub-band and N−1 indicates the highest frequency sub-band. For x(k, n), the entirety of sub-band signals where k=0, 1, 2, ..., N/2−1 is referred to as low frequency sub-band signal whereas the entirety of sub-band signals where k=N/2, N/2+1, N/2+2, ... N−1 is referred to as high frequency sub-band signal.

While the number of sub-bands is N/2 for both the low frequency side and the high frequency side in the above description, it is not necessary to use a same number of sub-bands for the low frequency side and the high frequency side. In other words, the ratio of the number of sub-bands of the low frequency side to the number of sub-bands of the high frequency side is not subjected to any particular limitation, although the total number of sub-bands remains equal to N.

The low frequency sub-band signal encoding circuit 12 encodes the low frequency sub-band signal x(k, n) and supplies encoded low frequency sub-band signal data to the multiplexing circuit 15.

The frequency amplitude peak information generating circuit 13 compares the new high frequency sub-band signal generated from the low frequency sub-band signal x(k, n) with the original high frequency sub-band signal x(k, n) for the frequency amplitude peak in each sub-band to generate frequency amplitude peak information of the high frequency sub-band signal. Thereafter, the frequency amplitude peak information generating circuit 13 supplies the frequency amplitude peak information of the high frequency sub-band signal to the multiplexing circuit 15. The method that the frequency amplitude peak information generating circuit 13 uses to generate frequency amplitude peak information of the high frequency sub-band signal will be described in greater detail hereinafter.

The gain information generating circuit 14 compares the new high frequency sub-band signal generated from the low frequency sub-band signal x(k, n) with the original high frequency sub-band signal x(k, n) for the gain in each sub-band to generate gain information of the high frequency sub-band signal. Thereafter, the gain information generating circuit 14 supplies the gain information of the high frequency sub-band signal to the multiplexing circuit 15. The method that the gain information generating circuit 14 uses to generate gain information of the high frequency sub-band signal will be described in greater detail hereinafter.

The multiplexing circuit 15 multiplexes the encoded data of the low frequency sub-band signal, the frequency amplitude information of the high frequency sub-band signal and the gain information of the high frequency sub-band signal and outputs compressed data.

Now, the methods that the frequency amplitude peak information generating circuit 13 and the gain information generating circuit 14 respectively use to generate frequency amplitude peak information of the high frequency sub-band signal and gain information of the high frequency sub-band signal will be described in detail below.

Firstly, the method that the above-described frequency signal amplitude peak information generating circuit 13 uses to generate frequency amplitude peak information of the high frequency sub-band signal will be described.

The frequency amplitude peak information generating circuit 13 firstly folds the low frequency sub-band signal x(k, n) by means of a frequency aliasing method (see, inter alia, the letter of specification of U.S. Pat. No. 5,068,899).

Figure 3:
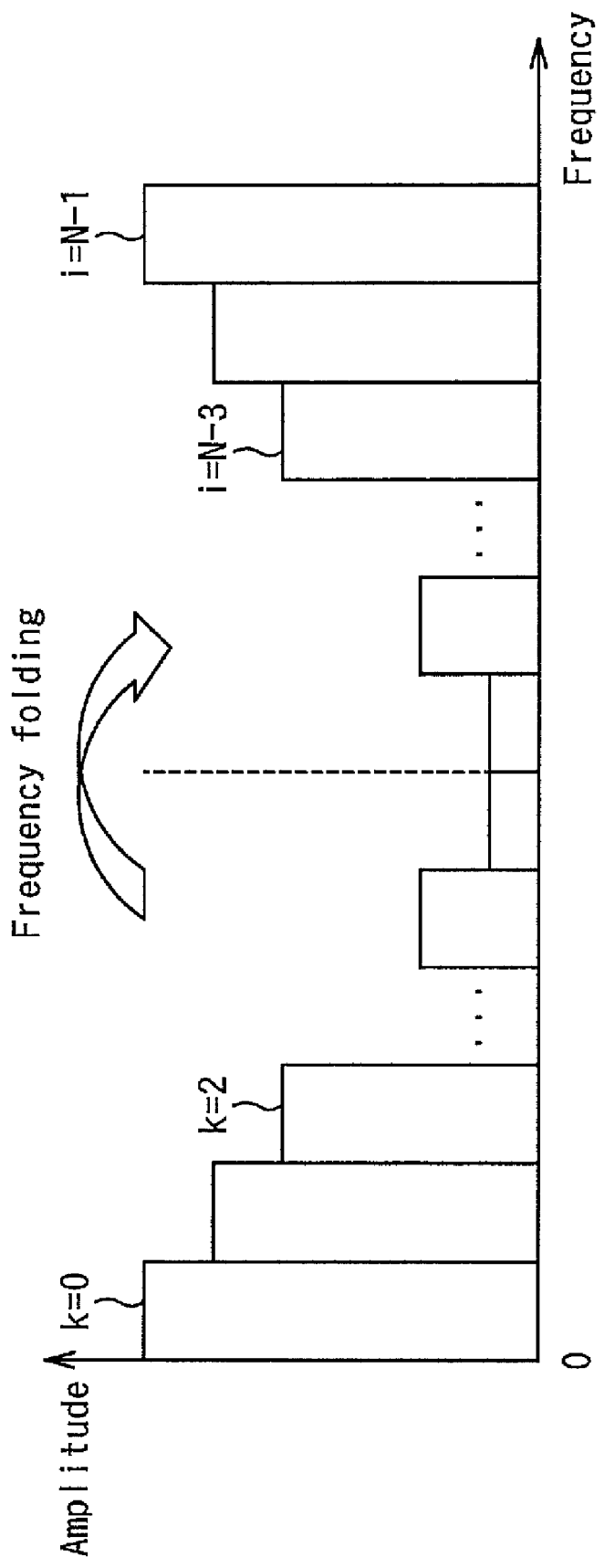
FIG. 3 is a graph illustrating the frequency folding of a sub-band signal by means of a frequency aliasing method.

With the frequency aliasing method, the frequency amplitude peak information generating circuit 13 folds the low frequency sub-band signal x(k, n) at the N/2-th sub-band as shown in FIG. 3. Then, for example, the high frequency sub-band signal of i=N−1 is made to correspond to the low frequency sub-band signal of k=0 and the high frequency sub-band signal of i=N−3 is made to correspond to the low frequency sub-band signal of k=2.

If the high frequency sub-band signal obtained by folding the frequency is xa(i, n), the high frequency sub-band signal xa(i, n) and the low frequency sub-band signal x(k, n) show a relationship expressed by formula (1) below.

[formula 1]

$$xa(i,n)=x(k,n), i=N-k-1, k=0,1,2,\ldots,N/2-1 \quad (1)$$

The frequency amplitude peak information generating circuit 13 then obtains Xa(i, ω) by subjecting the high frequency sub-band signal Xa(i, n) to discrete Fourier transform, where ω=0, 1, 2, ..., M−1, which represents the frequency index of discrete Fourier transform and M represents the transform block length of discrete Fourier transform. The frequency amplitude peak information generating circuit 13 also obtains X(k, ω) by subjecting the original high frequency sub-band signal x(k, n) to discrete Fourier transform, where ω=0, 1, 2, ..., M−1.

Subsequently, the frequency amplitude peak information generating circuit 13 defines Xa(i)max as maximum value of the frequency amplitude |Xa(i, ω)| of the high frequency sub-band signal xa(i, n) obtained by folding the frequency and X(k)max as maximum value of the frequency amplitude |X(k, ω)| of the original high frequency sub-band signal x(k, n). Since the gain of the high frequency sub-band signal xa(i, n) obtained by folding the frequency differs from that of the original high frequency sub-band signal x(k, n) for each sub-band, the frequency amplitude peak information generating circuit 13 normalizes Xa(i)max by means of formula (2) shown below.

[formula 2]

$$Xan(i)\max = Xa(i)\max * sqrt\left(\sum_{\omega=0}^{M-1} |X(i,\omega)|^{\wedge}2 \Big/ \sum_{\omega=0}^{M-1} |Xa(i,\omega)|^{\wedge}2\right) \quad (2)$$

$$i = N/2, N/2+1, N/2+2, \ldots, N-1$$

Subsequently, the frequency amplitude peak information generating circuit 13 computationally determines frequency amplitude peak information of the high frequency sub-band signal p(i) by means of formula (3) shown below.

[formula 3]

$$p(i)=X(i)\max/Xan(i)\max, i=N/2, N/2+1, N/2+2, N-1 \quad (3)$$

Then, the frequency amplitude peak information generating circuit 13 quantizes the frequency amplitude peak information of the high frequency sub-band signal p(i) by means of a 3-bit quantization table as shown in FIG. 4 and supplies the quantized frequency amplitude peak information of the high frequency sub-band signal p(i) to the multiplexing circuit 15.

Techniques that can be used to newly generate a high frequency sub-band signal xa(i, n) by using the low frequency sub-band signal include the above-described frequency aliasing method and a frequency shift method.

Now, the method that the above-described gain information generating circuit 14 uses to generate gain information of the high frequency sub-band signal g(i) will be described in detail below.

Firstly, the gain information generating circuit 14 folds the low frequency sub-band signal x(k, n) by means of the above-described frequency aliasing method.

Then, the gain information generating circuit 14 computationally determines gain information of the high frequency sub-band signal g(i) that indicates the difference between the gain of the high frequency sub-band signal xa(i, n) obtained by folding the frequency and that of the original high frequency sub-band signal x(k, n) for each sub-band by means of formula (4) shown below:

[formula 4]

$$g(i) = sqrt\left(\sum_{n=b}^{b+B} x(i, n)^{\wedge}2 \Big/ \sum_{n=b}^{b+B} x(k, n)^{\wedge}2\right), \quad (4)$$
$$i = N - k - 1,$$
$$k = 0, 1, 2, \ldots,$$
$$N/2 - 1,$$

where B represents the sample interval and g(i) represents high frequency sub-band signal gain information for B sample interval from a certain clock time b.

The gain information generating circuit 14 subsequently encodes the gain information of the high frequency sub-band signal g(i) and supplies the encoded gain information of the high frequency sub-band signal g(i) to the multiplexing circuit 15. Techniques that can be used for encoding g(i) include the difference quantization method, the Huffman encoding method and other methods that are well known to those skilled in the art.

As described above, the signal encoding apparatus 10 according to the present embodiment generates the frequency amplitude peak information of the high frequency sub-band signal p(i) and the gain information of the high frequency sub-band signal g(i) in addition to the encoded data of the low frequency sub-band signal, and supplies the encoded data of the low frequency sub-band signal and those two information items to a signal decoding apparatus. The signal decoding apparatus adjusts the gain and frequency amplitude peak of the high frequency sub-band signal xa(i, n) obtained by expanding the frequency band based on the two information items.

Meanwhile, the above-described signal encoding apparatus 10 compares the high frequency sub-band signal xa(i, n) generated from the low frequency sub-band signal x(k, n) before being encoded and the original high frequency sub-band signal x(k, n) to generate frequency amplitude peak information of the high frequency sub-band signal and gain information of the high frequency sub-band signal. On the other hand, the signal decoding apparatus adjusts the frequency amplitude peak and the gain of the high frequency sub-band signal xa(i, n) generated from the encoded and decoded low frequency sub-band signal x(k, n) according to the frequency amplitude peak information of the high frequency sub-band signal and the gain information of the high frequency sub-band signal respectively.

To be rigorous, the low frequency sub-band signal x(k, n) is different before the encoding and after the decoding. Therefore, to be rigorous, the frequency amplitude peak and the gain of the original high frequency sub-band signal differ from those of the high frequency sub-band signal of which the frequency amplitude peak and the gain are adjusted by the signal decoding apparatus.

Therefore, it may be so arranged that the signal encoding apparatus also generates frequency amplitude peak information of the high frequency sub-band signal and gain information of the high frequency sub-band signal from the decoded data of the low frequency sub-band signal obtained after the encoding and the decoding.

Figure 1:
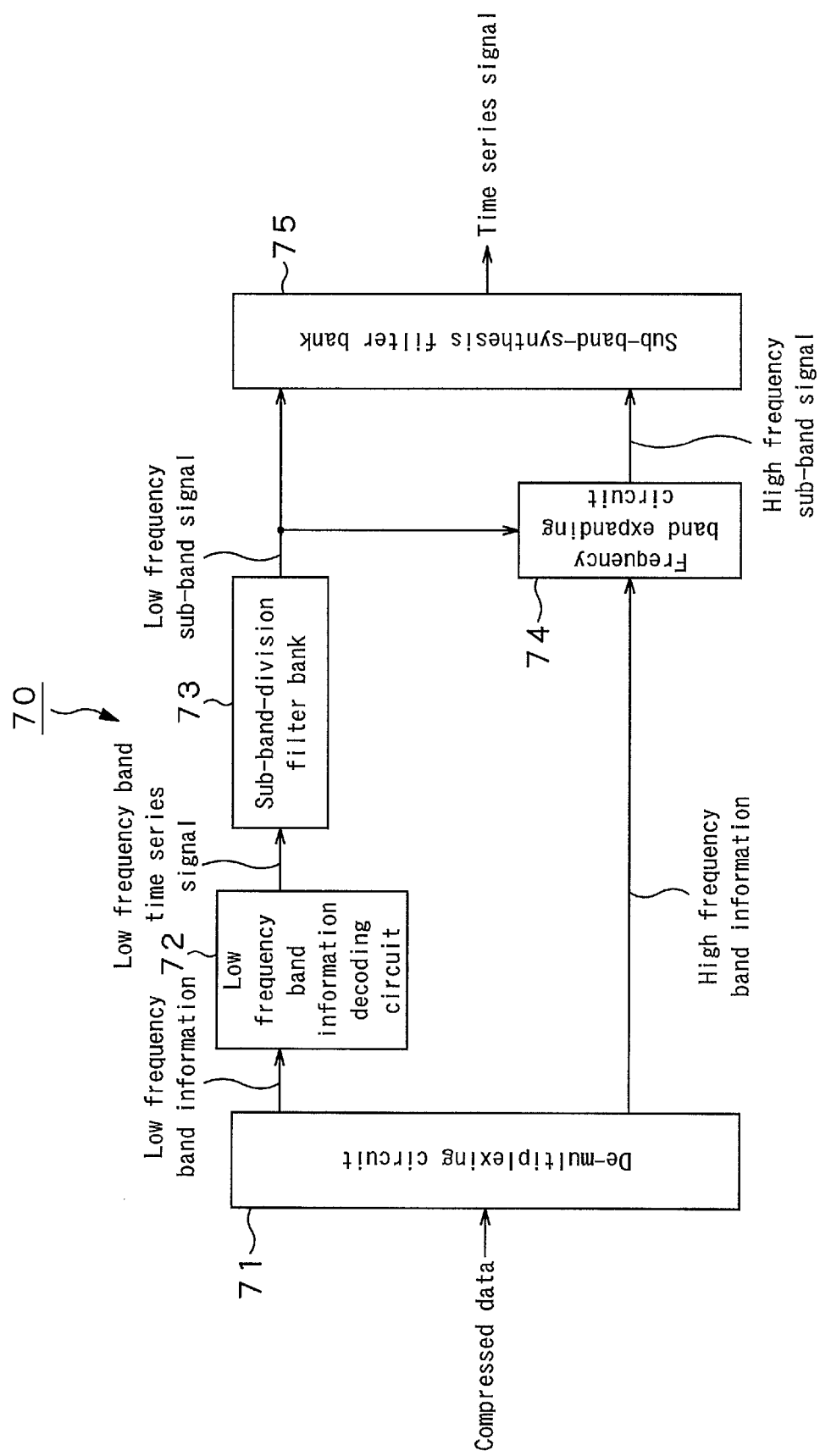
FIG. 1 is a schematic block diagram of a signal decoding apparatus for frequency band expansion by means of HE-AAC, illustrating the configuration thereof.
Figure 5:
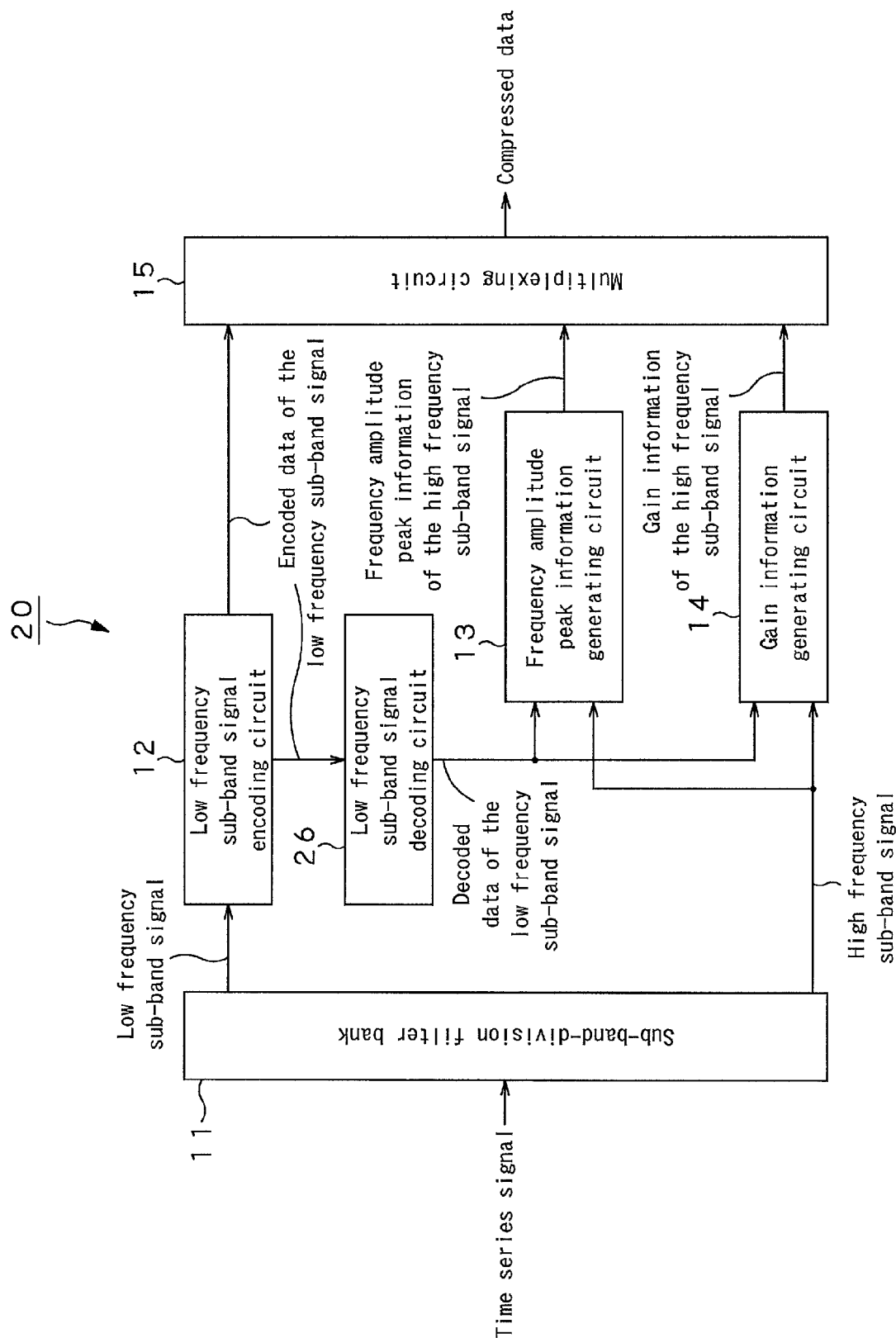
FIG. 5 is a schematic block diagram of another example of the signal encoding apparatus according to the embodiment of the present invention.

FIG. 5 is a schematic block diagram of such a signal encoding apparatus, showing the configuration thereof. In FIG. 5, the components same as or similar to those of the signal encoding apparatus 10 of FIG. 1 are denoted respectively by the same reference symbols and will not be described here any further.

With the signal encoding apparatus 20 of FIG. 5, after the low frequency sub-band signal encoding circuit 12 generates encoded data of the low frequency sub-band signal, the low frequency sub-band signal decoding circuit 26 decodes the encoded data of the low frequency sub-band signal data. Then, the low frequency sub-band signal decoding circuit 26 supplies the decoded data of the low frequency sub-band signal to the frequency amplitude peak information generating circuit 13 and the gain information generating circuit 14. Subsequently, the frequency amplitude peak information generating circuit 13 compares the frequency amplitude peak of the new high frequency sub-band signal xa(i, n) generated from the decoded data of the low frequency sub-band signal and the original high frequency sub-band signal x(k, n) to generate frequency amplitude peak information of the high frequency sub-band signal. Similarly, the gain information generating circuit 14 compares the gain of the new high frequency sub-band signal xa(i, n) generated from the decoded data of the low frequency sub-band signal and the original high frequency sub-band signal x(k, n) to generate gain information of the high frequency sub-band signal.

As a result, it is possible to alleviate the distortions of the process of encoding and decoding the low frequency sub-band signal and generate high quality frequency amplitude peak information of the high frequency sub-band signal and also high quality gain information of the high frequency sub-band signal.

Now, an embodiment of signal decoding apparatus adapted to generate a high frequency sub-band signal by using the above-described compressed data will be described below.

Figure 6:
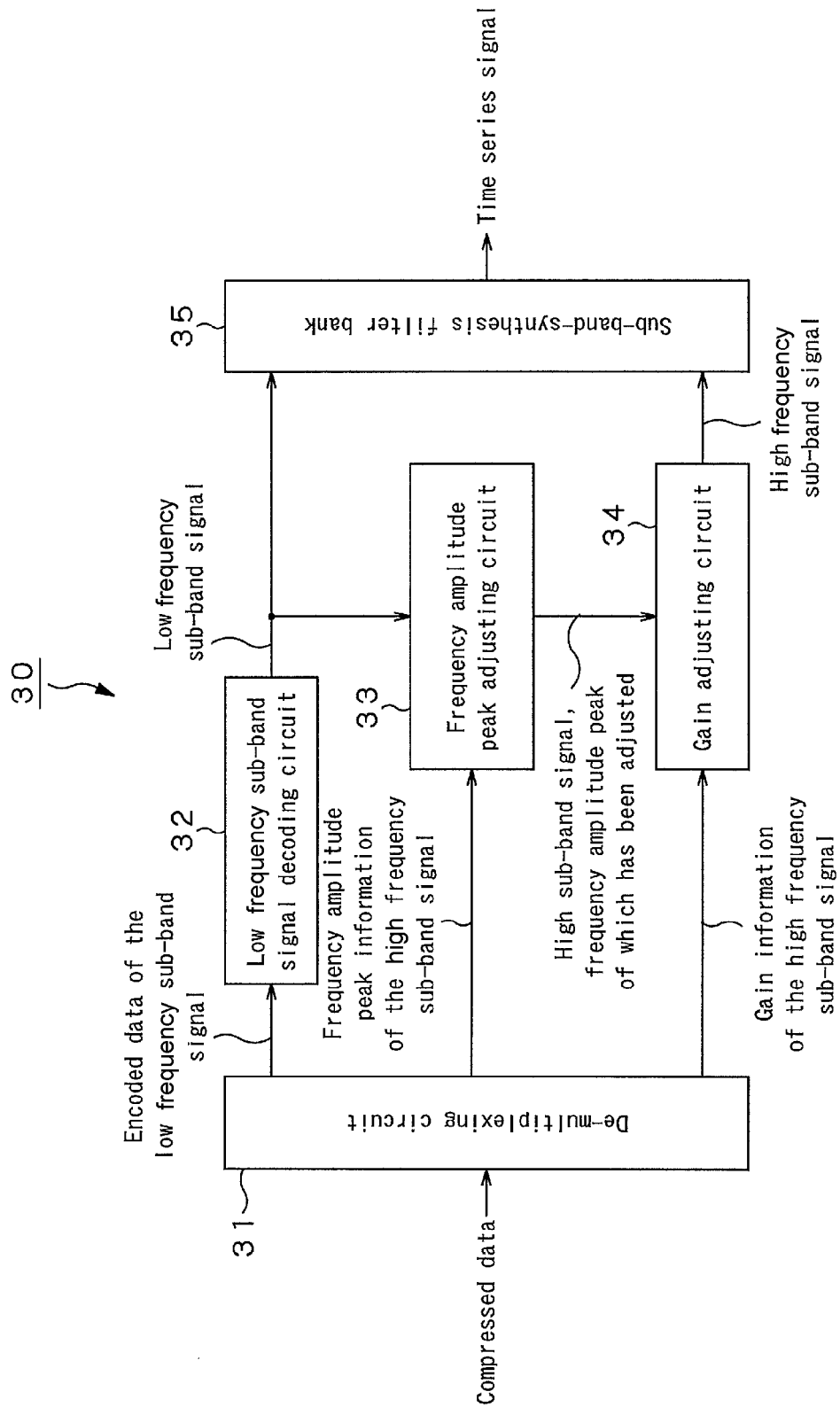
FIG. 6 is a schematic block diagram of a signal decoding apparatus according to another embodiment of the present inventoin, illustrating the configuration thereof.

Referring to FIG. 6, the signal decoding apparatus 30 of this embodiment has a de-multiplexing circuit 31, a low frequency sub-band signal decoding circuit 32, a frequency amplitude peak adjusting circuit 33, a gain adjusting circuit 34 and a sub-band-synthesis filter bank 35.

The de-multiplexing circuit 31 de-multiplexes the compressed data input from the signal encoding apparatus 10 and supplies the encoded data of the low frequency sub-band signal, the frequency amplitude peak information of the high frequency sub-band signal p(i) and the gain information of the high frequency sub-band signal g(i) respectively to the low frequency sub-band signal decoding circuit 32, the frequency amplitude peak adjusting circuit 33 and the gain adjusting circuit 34.

The low frequency sub-band signal decoding circuit 32 decodes the encoded data of the low frequency sub-band signal and supplies the low frequency sub-band signal x(k, n) to the frequency amplitude peak adjusting circuit 33 and the sub-band synthesis filter bank 35.

To be rigorous, the low frequency sub-band signal generated by the low frequency sub-band signal decoding circuit 32 differs from the low frequency sub-band signal x(k, n) that the sub-band division filter bank 11 of the signal encoding apparatus 10 supplies before encoding. However, it is assumed here that the low frequency sub-band signal does not change in the encoding and decoding process and the expression of x(k, n) that is same as the low frequency sub-band signal before encoding is employed.

The frequency amplitude peak adjusting circuit 33 expands the frequency band, using the low frequency sub-band signal x(k, n) and adjusts the frequency amplitude peak of the high sub-band signal xa(i, n) obtained as a result of the frequency band expansion according to the frequency amplitude peak information of the high frequency sub-band signal. Then, it supplies the high frequency sub-band signal xap(i, n) obtained by adjusting the frequency amplitude peak to the gain adjusting circuit 34. The method that the frequency amplitude peak adjusting circuit 33 uses to adjust the frequency amplitude peak will be described in greater detail hereinafter.

The gain adjusting circuit 34 adjusts the gain of the high frequency sub-band signal xap(i, n) obtained by adjusting the frequency amplitude peak according to the gain information of the high frequency sub-band signal and supplies the high frequency sub-band signal xapg(i, n) obtained by adjusting the frequency amplitude peak and the gain to the sub-band synthesis filter bank 35. The method that the gain adjusting circuit 34 uses to adjust the gain will be described in greater detail hereinafter.

The sub-band synthesis filter bank 35 combines the low frequency sub-band signal x(k, n) and the high frequency sub-band signal xapg(i, n) by sub-band synthesis and outputs a time series signal.

Now, the method that the frequency amplitude peak adjusting circuit 33 uses to adjust the frequency amplitude peak of the high frequency sub-band signal xa(i, n) and the method that the gain adjusting circuit 34 uses to adjust the gain of the high frequency sub-band signal xap(i, n) obtained as a result of adjusting the frequency amplitude peak will be described in detail below.

Firstly, the method that the frequency amplitude peak adjusting circuit 33 uses to adjust the frequency amplitude peak of the high frequency sub-band signal xa(i, n) will be described.

The frequency amplitude peak adjusting circuit 33 firstly expands the frequency band by means of the above-described frequency aliasing method, using the low frequency sub-band signal x(k, n) to obtain the high frequency sub-band signal xa(i, n).

Then, the frequency amplitude peak adjusting circuit 33 adjusts the gain of the frequency amplitude peak for the high frequency sub-band signal xa(i, n) obtained as a result of expanding the frequency band by means of formula (5) shown below:

[formula 5]

$$xap(i,n)=p(i)*xa(k,n)+sqrt(1-p(i)^2)*noise(n)*c(k)$$
$$i=N-k-1, k=0,1,2,\ldots,N/2-1 \quad (5),$$

where noise(n) is a signal not correlated with xa(k,n) and assumed to have average gain G and c(k) is a coefficient of normalization for equalizing the power of noise(n) and the power of with xa(k,n) and computationally determined by formula (6) shown below.

[formula 6]

$$c(k) = sqrt\left(1/T * \sum_{n=t}^{t+T} xa(k,n)^2\right)/G, k$$
$$= 0,1,2,\ldots,N/2-1 \quad (6)$$

The power of the not-correlated signal noise(n) of the average gain G becomes equal to the power of xa(k, n) in T sample interval when it is multiplied by the coefficient of normalization c(k). In the formula (5), the power of xa(k, n) and that of noise(n)*c(k) are equal to each other and the mixing ratio of xa(k, n) and noise(n)*c(k) is adjusted according to the frequency amplitude peak information of the high frequency sub-band signal p(i).

Subsequently, the frequency amplitude peak adjusting circuit 33 supplies the high frequency sub-band signal xap(i, n) obtained by adjusting the frequency amplitude peak to the gain adjusting circuit 34.

Now, the method that the gain adjusting circuit 34 uses to adjust the gain of the high frequency sub-band signal xap(i, n) obtained by adjusting the frequency amplitude peak will be described below.

The gain adjusting circuit 34 adjusts the gain of the high frequency sub-band signal xap(i, n) obtained by adjusting the frequency amplitude peak by means of formula (7) shown below and according to the gain information of the high frequency sub-band signal g(i) to generate high frequency sub-band signal xapg(i, n).

[formula 7]

$$xapg(i,n)=g(i)*xap(i,n), i=N-k-1, k=0,1,2,\ldots,N/2-1 \quad (7)$$

As a result, the gain of he high frequency sub-band signal xapg(i, n) and that of the original high frequency sub-band signal x(k, n) become equal to each other.

As described above, the frequency amplitude peak and the gain of the sub-band signal generated by the signal decoding apparatus 30 become equal to those of the original sub-band signal x(k, n) used by the signal encoding apparatus 10 over the entire frequency bands. Then, the signal decoding apparatus 30 can output a high quality time series signal.

The present invention is by no means limited to the above-described embodiments, which may be modified in various different ways without departing from the spirit and scope of the present invention.

While three bits are is used when quantizing the frequency amplitude peak information of the high frequency sub-band signal p(i) in the above-described embodiments, it is possible to use any quantization bit length that the auditory sense of human being is not able to detect because it is only necessary for the high frequency sub-band signal xapg(i) obtained as a result of frequency band expansion and the original high frequency sub-band signal x(k, n) to provide a same sound quality.

For example, the quantization bit length of the frequency amplitude peak information of the high frequency sub-band signal p(i) may be made short at the high frequency side in order to exploit the characteristics of the auditory sense of human being that the auditory sense is less sensitive to higher frequencies. As an example of such arrangements, a 3-bit quantization table as shown in FIG. 4 may be used for sub-bands where i is less than ¾N and a 2-bit quantization table as shown in FIG. 7 may be used for sub-bands where i=¾N or more.

Furthermore, the quantization bit length of the frequency amplitude peak information of the high frequency sub-band signal p(i) may be made variable as a function of sub-band so as to correspond to the power level of the sub-band signal for each sub-band in order to exploit the characteristics of the auditory sense of human being that the auditory sense is less sensitive to sub-band signals showing a weak power level. As an example, it may be so arranged that a 3-bit quantization table as shown in FIG. 4 is used for sub-band signals showing a predetermined power level or a higher level, while a 2-bit quantization table as shown in FIG. 7 is used for sub-band signals whose power level is lower than the predetermined level.

Additionally, while the frequency amplitude peak information generating circuit 13 supplies frequency amplitude peak information of the high frequency sub-band signal p(i) to the multiplexing circuit 15 for each sub-bands in the above-described embodiments, alternatively the frequency amplitude peak information of the high frequency sub-band signal p(i) may be shared by a plurality of sub-bands to reduce the quantity of data of the frequency amplitude peak information of the high frequency sub-band signal p(i) in order to exploit the characteristics of the auditory sense of human being that the auditory sense is less sensitive to higher frequencies. As an example, when high frequency sub-band signals xa(i, n) of 16 sub-bands are obtained as a result of expanding the frequency band, it may be divided into three sub-band regions of 3 sub-bands, 5 sub-bands and 8 sub-bands from the lower frequency side so that the frequency amplitude peak information of the high frequency sub-band signal p(i) may by supplied to the multiplexing circuit 15 so as to be used in common by the three sub-band regions.

While the embodiments are realized as hardware in the above description, the present invention is by no means limited thereto and any of them may be realized by causing a CPU (central processing unit) to execute a given computer program for any given process. The computer program may be provided by recording it on a recording medium or by transmitting it by way of a transmission medium such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A signal encoding apparatus for encoding an input time series signal, the apparatus comprising:
   division means for dividing the time series signal into a plurality of sub-bands to generate a low frequency sub-band signal formed by a plurality of low frequency side sub-bands and a high frequency sub-band signal formed by a plurality of high frequency side sub-bands;
   encoding means for encoding the low frequency sub-band signal to generate encoded data of the low frequency sub-band signal;
   frequency amplitude peak information generation means for generating a new high frequency sub-band signal from the low frequency sub-band signal and comparing a frequency amplitude peak of the new high frequency sub-band signal with a frequency amplitude peak of the high frequency sub-band signal to generate frequency amplitude peak information of the high frequency sub-band signal;
   gain information generation means for generating a new high frequency sub-band signal from the low frequency sub-band signal and comparing a gain of the new high frequency sub-band signal with a gain of the high frequency sub-band signal to generate gain information of the high frequency sub-band signal; and
   output means for multiplexing the encoded data of the low frequency sub-band signal, the frequency amplitude peak information of the high frequency sub-band signal and the gain information of the high frequency sub-band signal and outputting compressed data.

2. The apparatus according to claim 1, wherein the frequency amplitude peak information generation means normalizes the maximum value of the frequency amplitude of the new high frequency sub-band signal according to the ratio of the gain of the new high frequency sub-band signal and that of the high frequency sub-band signal and generates the frequency amplitude peak information of the high frequency sub-band signal as the ratio of the normalized maximum value of the new high frequency sub-band signal to the maximum value of the frequency amplitude of the high frequency sub-band signal.

3. The apparatus according to claim 1, wherein the gain information generation means generates the gain information of the high frequency sub-band signal as the ratio of the gain of the new high frequency sub-band signal to the gain of the high frequency sub-band signal.

4. The apparatus according to claim 1, wherein the frequency amplitude peak information generation means changes the quantization bit length of the frequency amplitude peak information of the high frequency sub-band signal as a function of the power level of each sub-band signal.

5. The apparatus according to claim 1, wherein the frequency amplitude peak information generation means makes the quantization bit length of the frequency amplitude peak information of the high frequency sub-band signal shorter toward high frequencies from low frequencies.

6. The apparatus according to claim 1, wherein the frequency amplitude peak information generation means uses the common frequency amplitude peak information of the high frequency sub-band signal for a plurality of sub-bands.

7. The apparatus according to claim 1, further comprising:
   low frequency sub-band signal decoding means for decoding the encoded data of the low frequency sub-band signal to generate decoded data of the low frequency sub-band signal;
   the frequency amplitude peak information generation means generating a new high frequency sub-band signal from the decoded data of the low sub-band signal and comparing the frequency amplitude peak of the newly generated high frequency sub-band signal and the high frequency sub-band signal to generate frequency peak information of the high frequency sub-band signal, and the gain information generation means generating a new high frequency sub-band signal from the decoded data of the low frequency sub-band signal and comparing the gain of the newly generated high frequency sub-band signal and the high frequency sub-band signal to generate gain information of the high frequency sub-band signal.

8. A signal encoding method of encoding an input time series signal, the method comprising:
   a division step of dividing the time series signal into a plurality of sub-bands to generate a low frequency sub-band signal formed by a plurality of low frequency side sub-bands and a high frequency sub-band signal formed by a plurality of high frequency side sub-bands;
   an encoding step of encoding the low frequency sub-band signal to generate encoded data of the low sub-band signal;
   a frequency amplitude peak information generation step of generating a new high frequency sub-band signal from the low frequency sub-band signal and comparing a frequency amplitude peak of the new high frequency sub-band signal with a frequency amplitude peak of the high frequency sub-band signal to generate frequency amplitude peak information of the high frequency sub-band signal;
   a gain information generation step of generating a new high frequency sub-band signal from the low frequency sub-band signal and comparing the gain of the new high frequency sub-band signal with a gain of the high frequency sub-band signal to generate gain information of the high frequency sub-band signal; and an output step of multiplexing the encoded data of the low frequency sub-band signal, the frequency amplitude peak information of the high sub-band signal and the gain information of the high frequency sub-band signal and outputting compressed data.

9. A tangible storage medium having stored thereon a program for causing a computer to execute a signal encoding process of encoding an input time series signal, the program comprising:

a division step of dividing the time series signal into a plurality of sub-bands to generate a low frequency sub-band signal formed by a plurality of low frequency side sub-bands and a high frequency sub-band signal formed by a plurality of high frequency side sub-bands;

an encoding step of encoding the low frequency sub-band signal to generate encoded data of the low frequency sub-band signal;

a frequency amplitude peak information generation step of generating a new high frequency sub-band signal from the low frequency sub-band signal and comparing a frequency amplitude peak of the new high frequency sub-band signal with a frequency amplitude peak of the high frequency sub-band signal to generate frequency amplitude peak information of the high frequency sub-band signal;

a gain information generation step of generating a new high frequency sub-band signal from the low frequency sub-band signal and comparing a gain of the new high frequency sub-band signal with a gain of the high frequency sub-band signal to generate gain information of the high sub-band signal; and an output step of multiplexing the encoded data of the low frequency sub-band signal, the frequency amplitude peak information of the high frequency sub-band signal and the gain information of the high frequency sub-band signal and outputting compressed data.

10. A tangible computer-readable recording medium having recorded thereon a program for causing a computer to execute a signal encoding process of encoding an input time series signal, the recording medium recording the program comprising:

a division step of dividing the time series signal into a plurality of sub-bands to generate a low frequency sub-band signal formed by a plurality of low frequency side sub-bands and a high frequency sub-band signal formed by a plurality of high frequency side sub-bands;

an encoding step of encoding the low frequency sub-band signal to generate an encoded data of the low frequency sub-band signal;

a frequency amplitude peak information generation step of generating a new high frequency sub-band signal from the low frequency sub-band signal and comparing a frequency amplitude peak of the new high frequency sub-band signal with a frequency amplitude peak of the high frequency sub-band signal to generate frequency amplitude peak information of the high frequency sub-band signal;

a high sub-band signal gain information generation step of generating a new high frequency sub-band signal from the low frequency sub-band signal and comparing a gain of the new high frequency sub-band signal with a gain of the high frequency sub-band signal to generate gain information of the high frequency sub-band signal; and an output step of multiplexing the encoded data of the low frequency sub-band signal, the frequency amplitude peak of the high frequency sub-band signal and the gain information of the high frequency sub-band signal and outputting compressed data.

11. A signal decoding apparatus for decoding compressed data encoded at an encoding side and outputting a time series signal, the apparatus comprising:

separation means for de-multiplexing the compressed data and providing (a) encoded data of the low frequency sub-band signal, (b) frequency amplitude peak information of the high frequency sub-band signal, and (c) gain information of the high frequency sub-band signal;

low frequency sub-band signal decoding means for decoding the encoded data of the low frequency sub-band signal to generate a low frequency sub-band signal;

frequency amplitude peak adjustment means for expanding a frequency band of the sub-band signal by using the low frequency sub-band signal, and adjusting the frequency amplitude peak of the high frequency sub-band signal by using the frequency amplitude peak information of the high frequency sub-band signal to generate an adjusted high frequency sub-band signal;

gain adjustment means for adjusting a gain of the adjusted high frequency sub-band signal by using the gain information of the high frequency sub-band signal; and output means for outputting a time series signal by combining the low frequency sub-band signal of the low frequency sub-band signal decoding means and the high frequency sub-band signal of the gain adjustment means.

12. The apparatus according to claim 11, wherein the frequency amplitude peak adjustment means mixes the high frequency sub-band signal and a signal having no correlation and the same gain with the high frequency sub-band signal with a mixing ratio according to the frequency amplitude peak information of the high frequency sub-band signal.

13. The apparatus according to claim 11, wherein the gain adjustment means adjusts the gain by multiplying the adjusted high frequency sub-band signal by the gain information of the high frequency sub-band signal.

14. A signal decoding method of decoding compressed data encoded at an encoding side and outputting a time series signal, the method comprising:

a separation step of de-multiplexing the compressed data and providing (a) encoded data of the low frequency sub-band signal, (b) frequency amplitude peak information of the high frequency sub-band signal, and (c) gain information of the high frequency sub-band signal;

a low frequency sub-band signal decoding step of decoding the encoded data of the low frequency sub-band signal to generate a low frequency sub-band signal;

a frequency amplitude peak adjustment step of expanding a frequency band of the sub-band signal by using the low frequency sub-band signal, and adjusting the frequency amplitude peak of the high frequency sub-band signal by using the frequency amplitude peak information of the high frequency sub-band signal to generate an adjusted high frequency sub-band signal;

a gain adjustment step of adjusting a gain of the adjusted high frequency sub-band signal by using the gain information of the high frequency sub-band signal; and an output step of outputting a time series signal by combining the low frequency sub-band signal and the high frequency sub-band signal, the gain of which has been adjusted in the gain adjustment step.

15. A tangible storage medium having stored thereon a program for causing a computer to execute a signal decoding process of decoding compressed data encoded at an encoding side and outputting a time series signal, the program comprising:
- a separation step of de-multiplexing the compressed data and providing (a) encoded data of the low frequency sub-band signal, (b) frequency amplitude peak information of the high frequency sub-band signal, and (c) gain information of the high frequency sub-band signal;
- a low frequency sub-band signal decoding step of decoding the encoded data of the low sub-band signal to generate a low frequency sub-band signal;
- a frequency amplitude peak adjustment step of expanding a frequency band of the sub-band signal by using the low frequency sub-band signal, and adjusting the frequency amplitude peak of the high frequency sub-band signal by using the frequency amplitude peak information of the high frequency sub-band signal to generate an adjusted high frequency sub-band signal;
- a gain adjustment step of adjusting a gain of the adjusted high frequency sub-band signal by using the gain information of the high frequency sub-band signal; and
- an output step of outputting a time series signal by combining the low frequency sub-band signal and the high frequency sub-band signal, the gain of which has been adjusted in the gain adjustment step.

16. A tangible computer-readable recording medium having recorded thereon a program for causing a computer to execute a signal decoding process of decoding compressed data encoded at an encoding side and outputting a time series signal, the recording medium recording the program comprising:
- a separation step of de-multiplexing the compressed data and providing (a) encoded data of the low frequency sub-band signal, (b) frequency amplitude peak information of the high frequency sub-band signal, and (c) gain information of the high frequency sub-band signal;
- a low frequency sub-band signal decoding step of decoding the encoded data of the low frequency sub-band signal to generate a low frequency sub-band signal;
- a frequency amplitude peak adjustment step of expanding a frequency band of the sub-band signal by using the low frequency sub-band signal, and adjusting the frequency amplitude peak of the high frequency sub-band signal by using the frequency amplitude peak information of the high frequency sub-band signal to generate an adjusted high frequency sub-band signal;
- a gain adjustment step of adjusting a gain of the adjusted high frequency sub-band signal by using the gain information of the high frequency sub-band signal; and
- an output step of outputting a time series signal by combining the low frequency sub-band signal and the high frequency sub-band signal, the gain of which has been adjusted in the gain adjustment step.

17. A signal encoding apparatus for encoding an input time series signal, the apparatus comprising:
- a division unit that divides the time series signal into a plurality of sub-bands to generate a low frequency sub-band signal formed by a plurality of low frequency side sub-bands and a high frequency sub-band signal formed by a plurality of high frequency side sub-bands;
- an encoding unit that encodes the low frequency sub-band signal to generate encoded data of the low frequency sub-band signal;
- a frequency amplitude peak information generation unit that generates a new high frequency sub-band signal from the low frequency sub-band signal and compares a peak of the frequency amplitude of the new high frequency sub-band signal with a peak of the high frequency sub-band signal to generate frequency amplitude peak information of the high frequency sub-band signal;
- a gain information generation unit that generates a new high frequency sub-band signal from the low frequency sub-band signal and compares a gain of the new high frequency sub-band signal with a gain of the high frequency sub-band signal to generate gain information of the high frequency sub-band signal; and
- an output unit that multiplexes the encoded data of the low frequency sub-band signal, the frequency amplitude peak information of the high frequency sub-band signal and the gain information of the high frequency sub-band signal and outputs compressed data.

18. A signal decoding apparatus for decoding compressed data encoded at an encoding side and outputting a time series signal, the apparatus comprising:
- a separation unit that de-multiplexes the compressed data and provides (a) encoded data of the low frequency sub-band signal, (b) frequency amplitude peak information of the high frequency sub-band signal, and (c) gain information of the high frequency sub-band signal;
- a low frequency sub-band signal decoding unit that decodes the encoded data of the low frequency sub-band signal to generate a low frequency sub-band signal;
- a frequency amplitude peak adjustment unit that expands a frequency band of the sub-band signal by using the low frequency sub-band signal, and adjusting the frequency amplitude peak of the obtained high frequency sub-band signal by using the frequency amplitude of the high frequency sub-band signal to generate an adjusted high frequency sub-band signal;
- a gain adjustment unit that adjusts a gain of the adjusted high frequency sub-band signal by using the gain information of the high frequency sub-band signal; and
- an output unit that outputs a time series signal by combining the low frequency sub-band signal of the low frequency sub-band signal decoding unit and the high frequency sub-band signal of the gain adjustment unit.

* * * * *